United States Patent [19]

Amataka et al.

[11] Patent Number: 4,781,660
[45] Date of Patent: Nov. 1, 1988

[54] V-PULLEY FOR A CONTINUOUSLY VARIABLE TRANSMISSION

[75] Inventors: Atsushi Amataka, Tokyo; Mikio Kubo; Yoshitoshi Hagiwara, both of Saitama, all of Japan

[73] Assignee: Honda Giken Kogyo Kabushiki Kaisha, Tokyo, Japan

[21] Appl. No.: 69,982

[22] Filed: Jul. 6, 1987

[51] Int. Cl.$^4$ .............................................. F16H 55/36
[52] U.S. Cl. ..................................... 474/174; 474/177
[58] Field of Search ................ 474/166, 174, 177–184, 474/190–194; 29/159 R

[56] References Cited
U.S. PATENT DOCUMENTS
955,227 4/1910 Tunis ............................. 474/177 X

*Primary Examiner*—Thuy M. Bui
*Attorney, Agent, or Firm*—Lyon & Lyon

[57] ABSTRACT

A V-pulley is adapted for a continuously variable transmission which uses a chain belt composed of a plurality of chain blocks connected in its longitudinal direction, and a pair of V-pulleys operatively connected to each other through the chain belt. The V-pulley comprises a pair of conical pulley faces that the chain belt contacts, each of which is provided with a rough surface and a combination pattern of abrasion-prone and abrasion-resistant sections alternatively arranged at intervals shorter than the contact length and width of each chain block.

7 Claims, 7 Drawing Sheets

V-PULLEY FOR A CONTINUOUSLY VARIABLE TRANSMISSION

BACKGROUND OF THE INVENTION (1) Field of the Invention

The present invention relates generally to a pulley. More particularly, the present invention relates to a V-pulley structure which is adapted for application in a continuously variable transmission (CVT) employed in an automotive transmission system.

(2) Description of the Prior Art

In CVT systems employing a chain belt for transmitting drive power, the inside face of the pulley at which the chain belt rides is required to maintain a high coefficient of friction ($\mu$ value) for extended periods. (Hereinafter, the inside face of the pulley will be referred to as the pulley face.) In order to satisfy this requirement conventional V-pulleys have been subjected to surface roughing treatments in various manners. For example, the pulley surface can be hardened throughout by a carburizing treatment and, thereafter subjected to an abrasion treatment, followed by grinding to adjust the roughness of the surface. Alternately, the surface of the pulley can be hardened throughout and abraded, and, thereafter, subjected to a surface roughening treatment by means of a shot-peening process so as to form a predetermined surface roughness.

FIG. 1A and FIG. 1B are enlarged schematic illustrations showing the pulley face of a conventional V-pulley in contact with a chain belt. FIG. 1A shows the primary state of the pulley face provided with a rough surface by means of a mechanical treatment such as a shot-peening process. The rough surface contains many projections, "b" and recesses "c". A chain block "d" moves along this rough surface in the direction represented by the arrow in FIG. 1A, FIG. 1B shows the change of state of the pulley surface after running for a long period. As shown, the rough surface has been gradually abraded by the chain block, "d", and the projections, "b", have almost disappeared. The pulley face has, accordingly, become a smooth surface, "e", with a low coefficient of friction $\mu$.

Accordingly, such a V-pulley that is to be produced through a hardening treatment and a roughening treatment, be composed of a specific alloy material having high durability in order to maintain the pulley face with a high $\mu$ for a long period. Such alloy material is generally expensive. The alternative, however, would be to replace the V-pulley with a new one at short intervals in order to maintain a certain level of $\mu$ value.

In addition to the above problems, in order to keep the rough surface from abrading it is necessary to adequately lubricate the pulley face.

SUMMARY OF THE INVENTION

It is an object of the present invention to provide a V-pulley whose inside face contacting a chain belt can maintain a high coefficient of friction for a long period.

Another object of the present invention is to provide a V-pulley capable of being more readily maintained.

To accomplish these objects, the V-pulley according to the present invention is characterized in that its pulley face at which a chain belt contacts comprises alternately disposed regions of limited extent of abrasion-resistant and abrasion-prone materials rather than a uniform material extending the full contact length and width of each block of the chain belt. And further, the pulley face can be provided with a roughened surface by a roughing treatment performed before or after forming the aforementioned sections of different materials.

Other objects, features and advantages of the present invention will become apparent upon perusal of the following detailed description of the preferred embodiments of the present invention when taken in conjunction with the appended drawings.

DETAILED DESCRIPTION OF THE PREFERRED EMBODIMENT

Figure 1A:
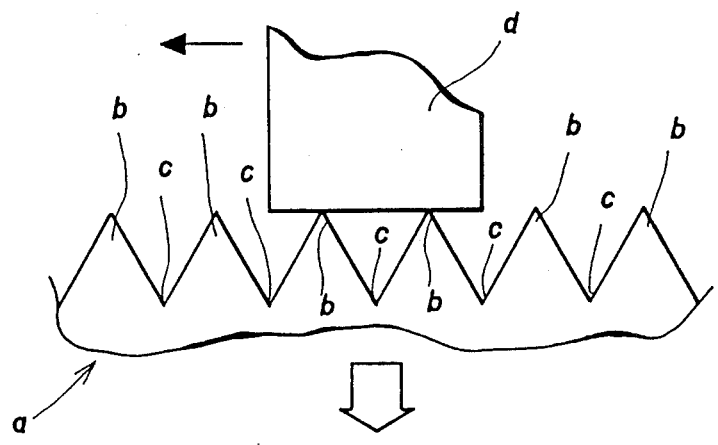
FIG. 1A is an enlarged schematic illustration showing a conventional pulley face.
Figure 1B:
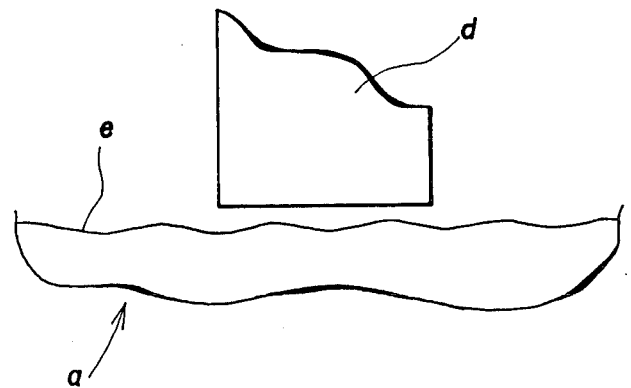
FIG. 1B is an enlarged schematic illustration showing the abraded condition of the pulley face shown in FIG. 1A.
Figure 2A:
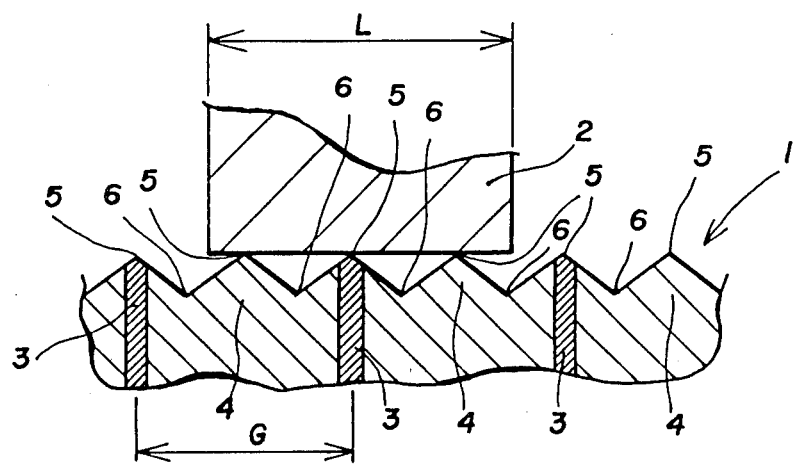
FIG. 2A is an enlarged schematic illustration showing a theoretical model of the pulley face according to the present invention.
Figure 2B:
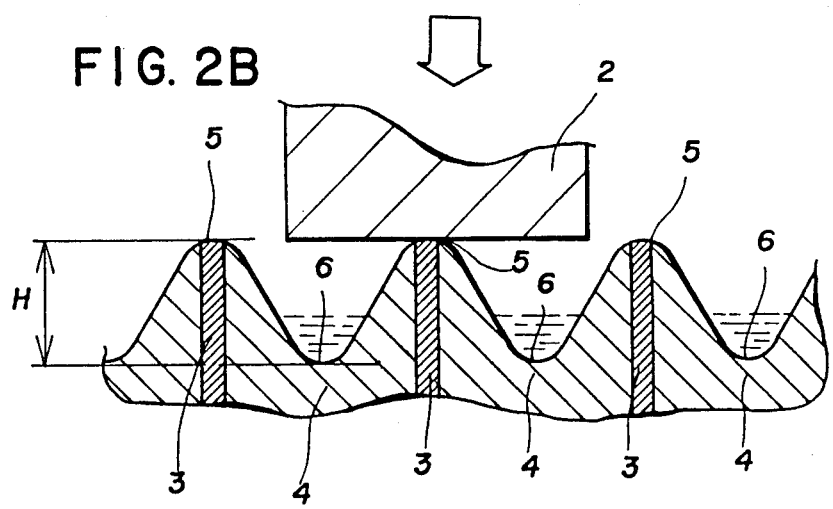
FIG. 2b is an enlarged schematic illustration showing a change of the pulley face shown in FIG. 2A after running for a certain period.

In order to facilitate for understanding of the present invention, a theoretical model is shown in FIGS. 2A and 2B. In detail, FIG. 2A shows the initial state of a pulley face 1 of the V-pulley according to the present invention. This pulley face 1 consists of alternating sections 3 and 4 consisting of abrasion-resistant and abrasion-prone materials respectively for contacting a chain block 2. The terminology "abrasion-resistant section" identifies a section that is not easily abraded in comparison with an abrasion-prone section. The abrasion-resistant sections 3 are arranged at regular intervals, one of which is indicated as G in FIG. 2A. This interval G is arranged to be shorter than the length L of each chain block 2. Further, the pulley face 1 is formed throughout with a rough surface containing many projections 5 and recesses 6.

The length L represents either the contact length or the contact width of the chain block 2 in its running direction. The interval distance G also represents either the length in the circular direction corresponding to the contact length or the radial direction corresponding to the contact width. According to this relationship between the interval distance G and the length L, the abrasion-resistant sections 3 and the abrasion-prone sections 4 are always contacted by the chain block 2 at the same time.

FIG. 2B shows a change of the pulley face configured as shown in FIG. 2A after running for an extended period. As the pulley face 1 is subjected to abrasion caused by the chain block 2, the degree of surface wear depends on the hardness of each section of the pulley face 1. That is, the abrasion-prone sections 4 tends to wear more rapidly in comparison with the other section 3. As a result, the recess 6 is caused to increase in depth and width after an extended period, so that the height H defined between the top of the projection 5 and the bottom of the recess 6 will be increased. This means that the degree of surface roughness of the pulley face 1 increases as the running period proceeds. Further, the chain block 2 always contacts with the recess 6 since the interval distance, G, of the abrasion-resistant section 3 is kept shorter than the contact length L of the chain block 2. According to this, the pulley face 1 can maintain its coefficient of friction $\mu$ at a high value in spite of running for a long period.

The deep recesses 6 formed in the pulley face 1 can beneficially contain lubricant for long periods, so that the contact surface can be kept in a good lubricating condition.

Figure 3:
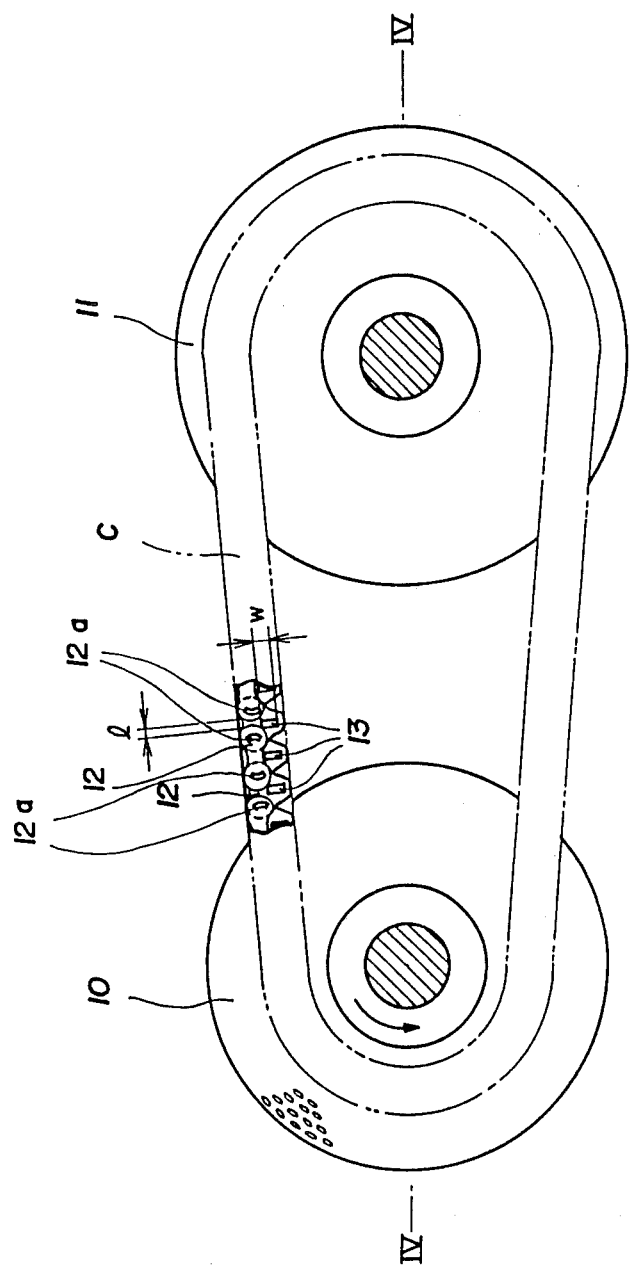
FIG. 3 is a schematic illustration showing a CVT system employing a first embodiment of V-pulley according to the present invention.

FIG. 3 illustrates in a schematic form a structure of CVT system structure employing a first embodiment of V-pulley according to the present invention. This CVT system structure per se, has been well known by those skilled in the art. In FIG. 3, a driving V-pulley 10 and a driven V-pulley 11 are mechanically connected through a chain belt C. This chain belt C is composed of a plurality of chain blocks 13 each of which is fixed on a mount piece 12, and links 12a for connecting the mount pieces 12. The chain blocks 13 are forcibly contacted with pulley faces to transmit driving power. The contact length and width of the chain block 13 are respectively represented in the drawing figure by the designations, "l" and "w".

The driving pulley 10 and the driven pulley 11 are each composed of a pair of sheaves including, in the case of the driving pulley 10, a stationary sheave 15 that is fixed on a drive shaft 14 connected to an engine and a movable sheave 16 that is slidably mounted thereon. These sheaves 15 and 16 have conical faces 18 and 19 which are symmetrically opposed to each other. The driven pulley 11 is also composed of a stationary sheave 20 and a movable sheave 21 (the reverse is possible) which are mounted on a driven shaft 17 in the same manner as the aforementioned sheaves are mounted on the driving pulley 10. The sheaves 20 and 21 are also similarly provided with conical faces 22 and 23.

Figure 4:
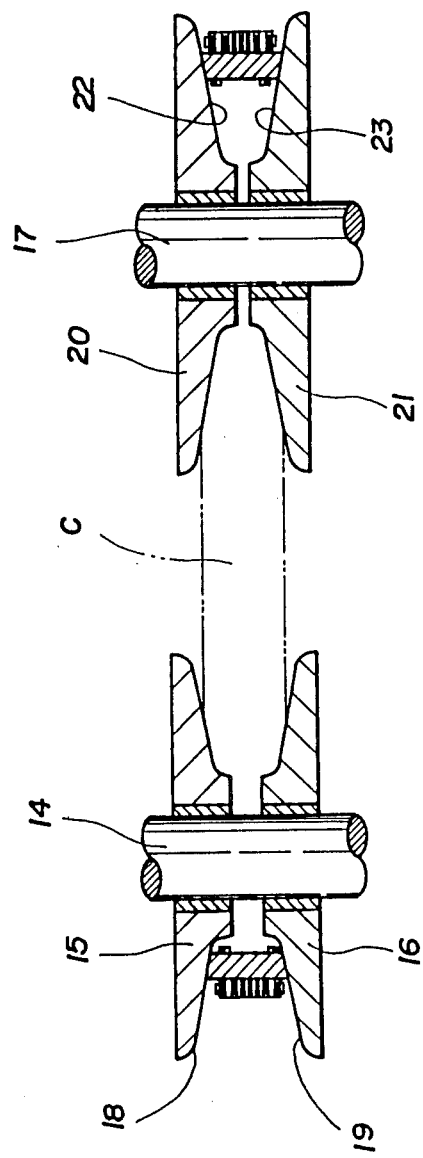
FIG. 4 is a sectional view taken along the line IV—IV in FIG. 3.

As shown in FIG. 4, these sheaves pairs 15 and 16, and 20 and 21, each define a substantially V-shape space between the conical faces 18 and 19, and 22 and 23, respectively. Such V-shape space can be controlled so as to change the turning radius of the chain belt C. According to this control, the speed transmitted from the drive shaft 14 to the driven shaft 17 can be continuously changed.

Figure 5:
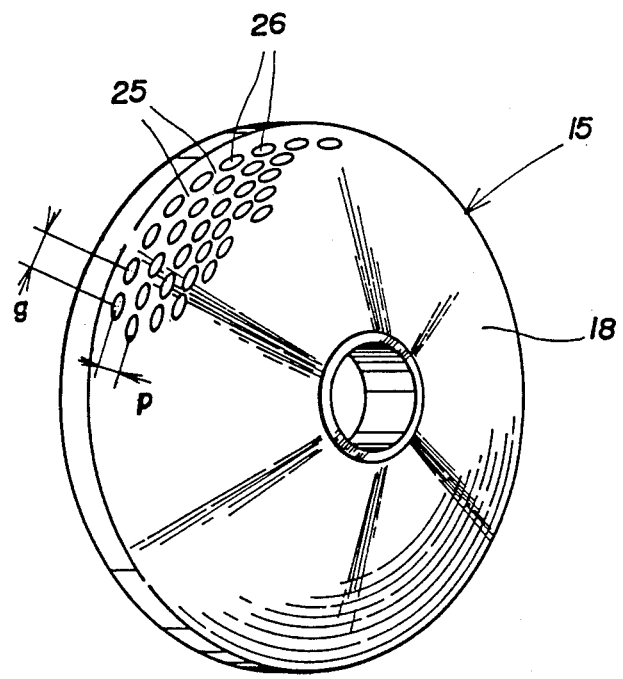
FIG. 5 is a schematic illustration showing a half part of the V-pulley shown in FIG. 3.

FIG. 5 shows the conical sheave 15 of the V-pulley. The surface configuration of the other sheaves 16, 20 and 21 being essentially same as this, the following explanation is equally applicable to each. The matrix of the conical base 18 is composed of a non-hard material and formed with many hard sections 26 at regular intervals by a partial remelting treatment. Accordingly, a combination pattern comprising non-hard sections 25, where the material has not been processed by this remelting treatment and hard sections 26 created by the remelting treatment appear on the conical face 18.

In this embodiment, the V-pulley is made of carbon steel S506 as its matrix material and thus its non-hard sections 25 correspond to the sorbite structure of the matrix structure while its hard sections correspond to the martensite structure thereof. Each interval distance of the hard sections is so designed that the radial pitch "p" is shorter than the contact width "w" of the chain block 13 and the circular pitch "g" is also shorter than the contact length "l". This configuration thus permits the chain block 13 to always contact the recessed non-hard sections 25, and therefore, can produce material wear and provide a high $\mu$ between the pulley face and the chain block 13.

In order to form the hard section 26 the matrix material of the pulley face is subjected to an irradiation treatment by means of a LASER beam which partially irradiates a spot beam at a regular distance. The irradiated sections on the sorbite structure (matrix material) are accordingly remelted and transformed into the martensite structure by the LASER beam.

The following table 1 represents one example of a LASER irradiated condition as employed in this embodiment.

TABLE 1

| Conditions of LASER Beam Irradiation | |
| --- | --- |
| Items | Value |
| LASER power (kw) | 1.3 |
| Distance for object/focal length | 1.05 |
| Velocity converted in a straight line (m/min) | 3.5–6.5 |
| Pulse frequency (Hz) | 30 |
| Pulse duty (%) | 50 |
| Material | S50C |
| Quenching width (mm) | 1.10 |
| Quenching depth (mm) | 0.33 |
| Hardness at a depth of 0.1 mm | Hmv 780 |
| Circular pitch "g" (mm) | 1.5 |
| Radial pitch "p" (mm) | 1.5 |
| Hardness of matrix material (HRC) | 30–31 |
| Change of surface roughness (Max) | +48 $\mu$m<br>−22 $\mu$m |

Figure 6:
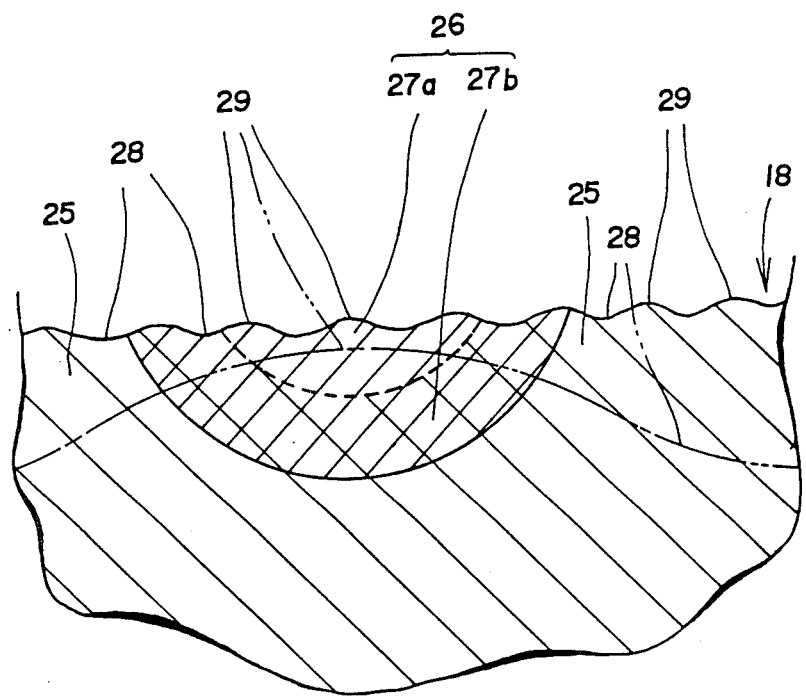
FIG. 6 is a partially enlarged sectional view showing the pulley face of FIG. 3 that has been subjected to LASER beam irradiation.

FIG. 6 shows an enlarged sectional view of the pulley face 18 following LASER irradiation. The hard section 26 is composed of a remelted layer 27a in the surface and a thermally influenced layer 27b inside thereof. In this embodiment, both of these layers 27a and 27b are formed in the martensite structure and they have equivalent hardness Hmv 770 to 790. The matrix material, non-hard section 25, is kept in the sorbite structure having a hardness of Hmv 400 or less.

The hardness of the hard sections 26 and non-hard sections 25 are not limited to these values, the equivalent effect being performable by forming a predetermined difference of hardness between these sections 25 and 26. If the V-pulley is made of cast iron, the hardness of the non-hard section 25 may be Hmv 200–300 and that of the hard section 26 may be Hmv 600–700.

Before or after the LASER beam irradiation the pulley face 18 is subjected to a surface roughening treatment in a well known manner so as to form recesses 28 and projections 29. The phantom line represents a typical aftergrowth of the recesses 28 and projections 29 following system operation for an extended period.

Table 2 represents comparative data between a V-pulley embodied as above mentioned and a conventional pulley.

TABLE 2

Comparison between the Present Invention and Conventional Art

| Material and Working | Initial | After 200 Hours |
|---|---|---|
| Conventional Art | | |
| SCM410 (carburized depth 1.0–1.2 mm) | Surface Roughness 3.2 S | Surface Roughness 0.7 S |
| Abrasion | μ 100* | μ 52 |
| Present Invention | | |
| S50C | Surface Roughness 3.2S | Surface Roughness ** |
| LASER beam irradiation | μ 100 | μ 120 |

*The initial μ of the conventional device is predetermined as a standard value 100, and thus the other μ is the ratio resulting therefrom.
**Its surface roughness was too great for accurate measurement.

As is clear from this table 2, the V-pulley according to the recent invention has its surface roughness increased as its running period proceeds. Therefore, this pulley can maintain so high a coefficient of friction that each chain block can be prevented from slipping and the driving force from the power unit can be effectively transmitted to the power train. Further, the recesses 28 formed in the non-hard sections 25 tend to expand over an extended period. Such recesses 28 may thus facilitate the retention of lubricant therein. This effect can eliminate the troublesome maintenance problem that lubricant must often be supplied between the chain block and the pulley faces.

Figure 7:
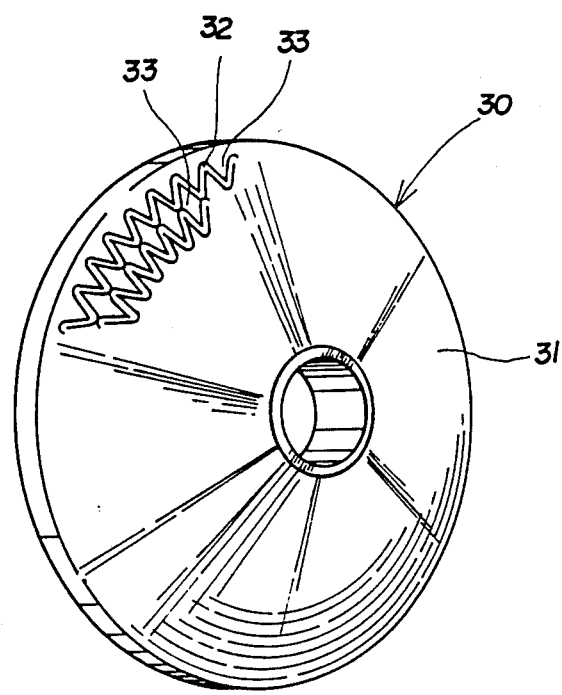
FIG. 7 is a schematic illustration showing a half part of a second embodiment of the invention in which the contains a modified material section pattern.

FIG. 7 shows a second embodiment for forming abrasion-resistant sections. In this drawing, a pulley face 31 of a v-pulley 30 is formed with abrasion-resistant sections 32 in a continuous wave shape pattern. Abrasion-prone sections (matrix material) 33 appear between the abrasion-resistant sections 32 continuously, and its working efficiency can be improved.

In the present invention, the configuration of the respective abrasion-prone sections and the abrasion-resistant sections is achieved by a combination of two materials having relatively different abrasive durability. Accordingly, this configuration is not to be limited to the difference in their respective hardness, but it can also be achieved by wear-producing characteristics of the chain block material caused by the friction fitness thereof. In this case, the abrasion-resistant section is made of a material having a poor friction fitness for the chain block and the abrasion-prone section is made of a good fitness material.

Further, in order to form the configuration of the abrasion-prone sections and the abrasion-resistant sections by a combination of materials of different hardness, various methods are well known and are shown in the table 3 below and on the following page.

TABLE 3

Composite Configuration Method

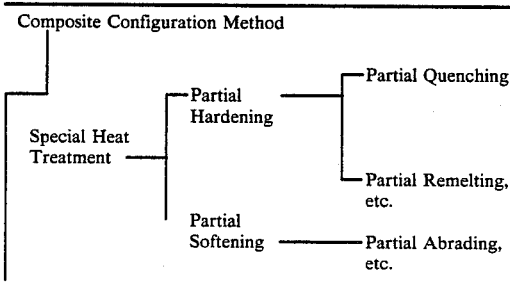

TABLE 3-continued

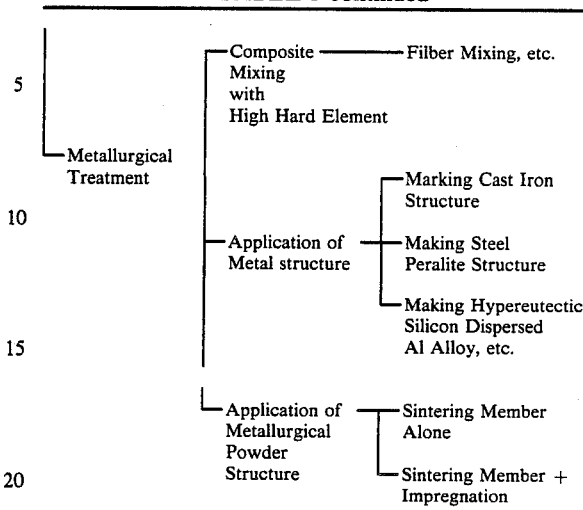

In this table, the partial remelting treatment corresponds to the treatment employed in the embodiment described above. For executing the special heat treatment, although the embodiment employs LASER beam irradiation, a specific means for concentrating heat energy such as an electron beam or plasma beam at a spot may preferably be used. This treatment optimally forms the alternating pattern of hard and non-hard sections at a fine intervals shorter than the contact width and length of the chain block. Distribution of the hard and non-hard sections need not always be uniform and their density can be freely designed. For example, the interval may be continuously varied and various patterns can be selectively combined.

It should be appreciated that, while the various embodiments of the present invention have been described in specific detail, numerous additions, omissions and modifications are possible within the intended spirit and scope of the invention.

What is claimed is:

1. A V-pulley apparatus adapted for a continuously variable transmission which uses a chain belt composed of a plurality of chain block connected in its longitudinal direction, and a pair of V-pulleys operatively connecting each other through the chain belt, comprising:
   a pair of conical pulley faces that the chain belt contacts, each face of which being provided with a rough surface and a combination pattern of abrasion-prone and abrasion-resistant sections alternately arranged at intervals shorter than the length and width of contact of each chain block with the respective pulley faces.

2. The V-pulley apparatus as set forth in claim 1, wherein the combination pattern comprises hard and non-hard sections alternately arranged at intervals shorter than the contact length and width of each chain block.

3. The V-pulley apparatus as set forth in claim 1, wherein the abrasion-prone section is a matrix material of the pulley face and the abrasion-resistant section is formed by applying a special heat treatment into the matrix material.

4. The V-pulley apparatus as set forth in claim 3, wherein the special heat treatment is selected from means for concentrating heat energy at the locations where the abrasion-resistant sections are formed.

5. The V-pulley apparatus as set forth in claim 1, wherein the abrasion-prone sections are made of material having a good friction fitness for the material of the chain block and the abrasion-resistant sections are made of material having poor friction fitness for the chain block.

6. The V-pulley apparatus as set forth in claim 1, wherein the abrasion-resistant sections are formed in a continuous wave shape pattern.

7. The V-pulley apparatus as set forth in claim 1, wherein the abrasion-resistant sections are formed by a dispersed dot pattern.

* * * * *